United States Patent
Choi

(10) Patent No.: US 11,659,437 B2
(45) Date of Patent: May 23, 2023

(54) WIRELESS DISTRIBUTED LEARNING SYSTEM INCLUDING ABNORMAL TERMINAL AND METHOD OF OPERATION THEREOF

(71) Applicant: Seoul National University R&DB Foundation, Seoul (KR)

(72) Inventor: Wan Choi, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/462,740

(22) Filed: Aug. 31, 2021

(65) Prior Publication Data

US 2022/0377601 A1 Nov. 24, 2022

(30) Foreign Application Priority Data

May 13, 2021 (KR) .......................... 10-2021-0062146

(51) Int. Cl.
| | |
|---|---|
| *H04W 4/00* | (2018.01) |
| *H04W 28/04* | (2009.01) |
| *H04W 24/10* | (2009.01) |
| *H04L 25/02* | (2006.01) |
| *H04L 67/303* | (2022.01) |

(52) U.S. Cl.
CPC ......... *H04W 28/04* (2013.01); *H04L 25/0204* (2013.01); *H04L 67/303* (2013.01); *H04W 24/10* (2013.01)

(58) Field of Classification Search
CPC .. H04W 28/04; H04W 24/10; H04L 25/0204; H04L 67/303
See application file for complete search history.

(56) References Cited

U.S. PATENT DOCUMENTS

| | | | |
|---|---|---|---|
| 2005/0282550 A1* | 12/2005 | Cho ...................... | H04W 72/56 |
| | | | 455/447 |
| 2019/0305877 A1* | 10/2019 | Lee ........................ | H04W 74/00 |
| 2020/0078688 A1* | 3/2020 | Kaethler ................ | G06N 20/20 |

(Continued)

FOREIGN PATENT DOCUMENTS

| | | |
|---|---|---|
| JP | 2018-133004 A | 8/2018 |
| JP | 2019-212131 A | 12/2019 |

(Continued)

OTHER PUBLICATIONS

Yang et al., "Byrdie: Byzantine-resilient distributed coordinate descent for decentralized learning," IEEE Transactions on Signal and Information Processing over Networks, 2019.

(Continued)

*Primary Examiner* — Atique Ahmed
(74) *Attorney, Agent, or Firm* — Jefferson IP Law, LLP

(57) ABSTRACT

An electronic device is provided. The electronic device includes a communication circuit and a processor. The processor may be configured to obtain information on the number of predicted abnormal terminals, allocate different resources respectively to a plurality of terminal groups, wherein the number of the plurality of terminal groups is greater than the number of predicted abnormal terminals, obtain learning data of each of the plurality of terminal groups, and identify a final terminal group among the plurality of terminal groups, based on the learning data.

18 Claims, 9 Drawing Sheets

(56) References Cited

U.S. PATENT DOCUMENTS

| | | | |
|---|---|---|---|
| 2020/0202989 A1* | 6/2020 | Dror | G06F 21/6245 |
| 2020/0298882 A1* | 9/2020 | Kobayashi | B60W 30/16 |
| 2021/0045093 A1* | 2/2021 | Rao | H04W 72/04 |
| 2021/0065276 A1* | 3/2021 | Sato | G06Q 30/0641 |
| 2021/0103678 A1* | 4/2021 | Dror | G06F 21/6245 |
| 2021/0219253 A1* | 7/2021 | Van Phan | H04L 41/0893 |
| 2021/0243162 A1* | 8/2021 | Farchy | H04L 63/104 |
| 2021/0344399 A1* | 11/2021 | Levy | H04L 5/0073 |

FOREIGN PATENT DOCUMENTS

| | | |
|---|---|---|
| KR | 10-0651569 B1 | 11/2006 |
| KR | 10-2017-0059315 A | 5/2017 |
| KR | 10-2019-0113229 A | 10/2019 |

OTHER PUBLICATIONS

Korean Notice of Patent Grant dated Nov. 29, 2022, issued in Korean Patent Application No. 10-2021-0062146.

* cited by examiner

WIRELESS DISTRIBUTED LEARNING SYSTEM INCLUDING ABNORMAL TERMINAL AND METHOD OF OPERATION THEREOF

CROSS-REFERENCE TO RELATED APPLICATION(S)

This application is based on and claims priority under 35 U.S.C. § 119(a) of a Korean patent application number 10-2021-0062146, filed on May 13, 2021, in the Korean Intellectual Property Office, the disclosure of which is incorporated by reference herein in its entirety.

BACKGROUND

1. Field

The disclosure relates to a wireless communication system. More particularly, the disclosure relates to a wireless distributed learning system including an abnormal terminal in the wireless communication system and an operating method thereof.

2. Description of Related Art

Wireless distributed learning means that a base station updates a system on the basis of a learning result obtained by processing or manipulating learning data transmitted from a wireless communication device (e.g., a terminal). The base station may update the entire system by obtaining learning data for each of a plurality of wireless communication devices, based on a wireless communication connection.

The above information is presented as background information only to assist with an understanding of the disclosure. No determination has been made, and no assertion is made, as to whether any of the above might be applicable as prior art with regard to the disclosure.

SUMMARY

With the increase in the use of wireless communication devices in recent years, there is a growing demand for a system update using wireless distributed learning. Since a large amount of learning data and high-complexity computation are required to ensure performance of wireless distributed learning, a base station may perform the wireless distributed learning by using a plurality of wireless communication devices (e.g., terminals). When a wireless communication device which operates abnormally is included in the plurality of wireless communication devices, there is a need for a method for ensuring performance of machine learning by preventing the learning data from affecting an overall wireless distributed learning result due to the abnormal operation.

The disclosure is proposed to solve a problem which occurs when some wireless communication devices perform an abnormal operation or a disturbing operation in the existing wireless distributed learning.

Aspects of the disclosure are to address at least the above-mentioned problems and/or disadvantages and to provide at least the advantages described below. Accordingly, an aspect of the disclosure is to provide a base station performing filtering on an abnormal wireless communication device, based on information on the number of abnormal wireless communication devices (e.g., terminals), thereby performing wireless distributed learning with high performance.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit and a processor. The processor may be configured to obtain information on the number of predicted abnormal terminals, allocate different resources respectively to a plurality of terminal groups, wherein the number of the plurality of terminal groups is greater than the number of predicted abnormal terminals, obtain learning data of each of the plurality of terminal groups, and identify a final terminal group among the plurality of terminal groups, based on the learning data.

In accordance with another aspect of the disclosure, a method performed by an electronic device is provided. The method includes obtaining information on the number of predicted abnormal terminals, allocating different resources respectively to a plurality of terminal groups, wherein the number of the plurality of terminal groups is greater than the number of predicted abnormal terminals, obtaining learning data of each of the plurality of terminal groups, and identifying a final terminal group among the plurality of terminal groups, based on the learning data.

In an apparatus and method according to various embodiments of the disclosure, a base station performs filtering on an abnormal wireless communication device, based on the number of abnormal wireless communication devices (e.g., terminals), thereby decreasing an influence caused by learning data of the abnormal wireless communication device.

In addition, in an apparatus and method according to various embodiments of the disclosure, an influence caused by learning data of an abnormal wireless communication device is decreased, thereby performing wireless distributed learning with high performance.

Other aspects, advantages, and salient features of the disclosure will become apparent to those skilled in the art to from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
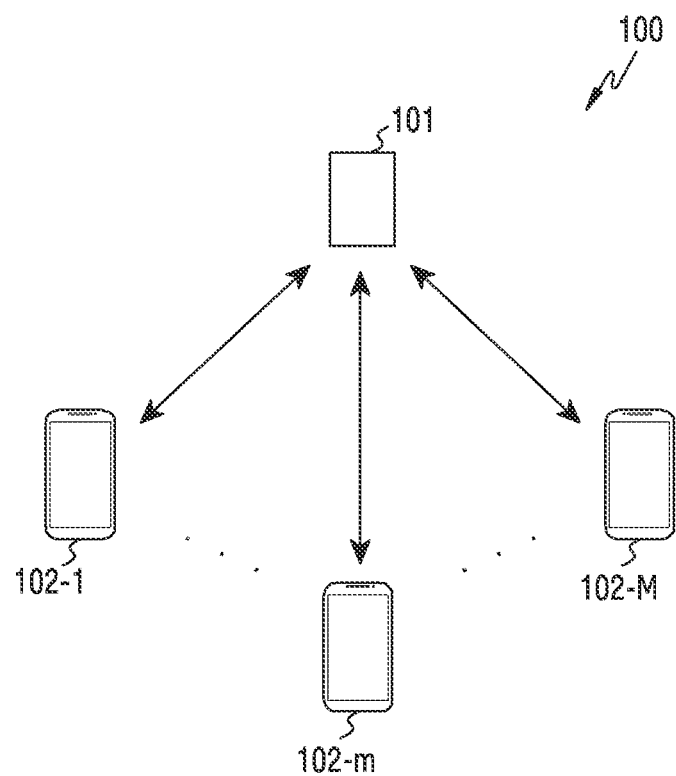
FIG. 1 illustrates an environment for performing wireless distributed learning in a network according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the disclosure to be described below, a hardware-based approach is described for example in the various embodiments of the disclosure described hereinafter. However, since the various embodiments of the disclosure include a technique in which hardware and software are both used, a software-based approach is not excluded in the embodiments of the disclosure.

Hereinafter, the disclosure relates to an apparatus and method for updating a system on the basis of a result of wireless distributed learning of an electronic device in a wireless communication system. Specifically, the disclosure describes a technique for updating a system on the basis of a result of wireless distributed learning which is more suitable for a real situation in consideration of the presence of an abnormal terminal in the wireless communication system.

Terms used in the following description, i.e., a term (e.g., a distance, a length, a range, and a radius) referring to a variable related to a position, a term (e.g., an electronic device and an external electronic device,) referring to network entities, and the like are examples for convenience of explanation. Accordingly, the disclosure is not limited to the terms described below, and other terms having equivalent technical meanings may also be used. In addition, although an expression 'greater than or equal to' or 'less than or equal to' is used in the disclosure to determine whether a specific condition is fulfilled, this is for purposes only and does not exclude an expression of 'greater than' or 'less than' A condition described as "greater than or equal to" may be replaced with "greater than". A condition described as "less than or equal to" may be replaced with "less than" A condition described as "greater than or equal to and less than" may be replaced with "greater than and less than or equal to".

Hereinafter, various embodiments of the disclosure are described with reference to the accompanying drawings. However, it should be appreciated that this is not intended to limit the technological features set forth herein to particular embodiments and include various changes, equivalents, or replacements for an embodiment of the disclosure.

FIG. 1 illustrates a system for performing wireless distributed learning in a network according to an embodiment of the disclosure.

Referring to FIG. 1 depicting a system 100, a base station may be referred to as not only the base station but also an 'Access Point (AP)', an 'eNodeB (eNB)', a '5th Generation (5G) node', a 'next generation NodeB (gNB)', a 'wireless point', a 'Transmission/Reception Point (TRP)', or other terms having equivalent technical meanings.

A terminal of FIG. 1 is a device which performs Machine Type Communication (MTC), and may be referred to as not only the terminal but also a 'User Equipment (UE)', a 'Customer Premises Equipment (CPE)', a 'mobile station', a 'subscriber station', a 'remote terminal', a 'wireless terminal', an 'electronic device', a 'user device', or other terms having equivalent technical meanings.

Referring to FIG. 1, the system may include a base station 101 and a plurality of terminals 102-1 to 102-M. It is assumed that the base station 101 may update the system, based on repetitive wireless distributed learning, and the base station 101 and each of the M terminals 102-1 to 102-M collect B pieces of learning data and labels in an independent and identically distributed manner. In this case, $\{(x_{0,b}, y_{0,b})\}_{b=1}^{B}$ may denote data collected by the base station 101, and $\{(x_{m,b}, y_{m,b})\}_{b=1}^{B}$ may denote data collected by any terminal_m 102-m among the M terminals 102-1 to 102-M.

Among the M terminals 102-1 to 102-M, the terminal_m 102-m may calculate a local gradient $g_m^t$ of the terminal_m 102-m through a sum of a loss function and a regularization function, based on learning data of the terminal_m 102-m and a model $\theta^t$ of the entire system in t-th repetitive learning. Accordingly, a sum $L_m^B(\theta)$ of the loss function and the regularization function may be calculated through the equation below to obtain the local gradient $g_m^t$ of the terminal_m 102-m.

$$L_m^B(\theta) = \frac{1}{B}\sum_{b=1}^{B} l(f(\theta, x_{m,b}), y_{m,b}) + R(\theta) \quad \text{Equation 1}$$

In Equation 1, $\theta \in \mathbb{R}^d$ (d is an even number) may denote a model of the entire system for learning, and a result of machine learning with an input of x may be expressed by $f(\theta,x)$. In addition, if a label for x is y, a loss function for this may be expressed by $l(f(\theta,x),y)$. $R(\theta)$ may denote a regularization function for controlling overfitting for the model of the entire system.

The terminal_m 102-m may calculate a local gradient $g_m^t$ for t-th learning data, based on the calculated sum of the loss function and the regularization function. Therefore, the local gradient $g_m^t$ of the terminal_m 102-$m$ may be calculated through the equation below.

$$g_m^t = \nabla L_m^B(\theta^t), \; m \in [1:M] \quad \text{Equation 2}$$

In Equation 2, $L(\theta)$ may denote the sum of the loss function and the regularization function, and $m \in [1:M]$ may denote that it is a local gradient of the terminal_m 102-$m$ among the M terminals 102-1 to 102-M.

According to an embodiment, the terminal_m 102-$m$ may transmit information including the calculated local gradient $g_m^t$ to the base station. According to an embodiment, if the terminal_m 102-$m$ is a terminal which operates abnormally, not the calculated local gradient $g_m^t$ but any vector may be transmitted to the base station 101. According to an embodiment, the abnormal operation is an operation which causes performance degradation of wireless distributed learning in the base station 101, and may include at least one of an operation for intentionally interfering with learning, an abnormal operation caused by aging of the system, and an abnormal operation caused by an error on wireless channel transmission. For example, a terminal which operates abnormally may include a byzantine fault terminal which causes performance degradation of wireless distributed learning.

According to an embodiment, the base station 101 may obtain local gradients for learning data of each of the M terminals 102-1 to 102-M including the terminal_m 102-$m$, based on information received from the M terminals 102-1 to 102-M including the terminal_m 102-$m$.

According to an embodiment, the base station 101 may determine an estimated gradient $\hat{g}^t$ by processing the local gradients for learning data of each of the M terminals 102-1 to 102-M. For example, the base station 101 may determine the estimated gradient $\hat{g}^t$ by calculating an average gradient of the local gradients for the learning data of each of the M terminals 102-1 to 102-M.

According to an embodiment, the base station 101 may update a model of the entire system, based on the estimated gradient $\hat{g}^t$. According to an embodiment, the base station 101 may broadcast an updated model $\theta^{t+1}$ of the entire system to the M terminals 102-1 to 102-M.

According to an embodiment, if the terminal_m 102-$m$ is a terminal which operates abnormally, the base station 101 may update the entire system, based on an arbitrary vector received from the terminal_m 102-$m$ due to the abnormal operation, which may lead to performance degradation of wireless distributed learning. In this case, the arbitrary vector may be any vector independent of wireless distributed learning.

However, the base station according to embodiments of the disclosure updates the system by identifying a normal terminal group, based on information on the number of predicted abnormal terminals, thereby preventing performance degradation of wireless distributed learning, caused by the abnormal terminal, and performing efficient distributed learning.

Although it is illustrated in FIG. 1, for example, that a base station receives learning data (e.g., a local gradient) from a plurality of terminals to update a system, embodiments of the disclosure are not limited thereto. According to an embodiment, any one terminal among the plurality of terminals may receive the learning data (e.g., the local gradient) from the remaining terminals to update the system.

Figure 2:
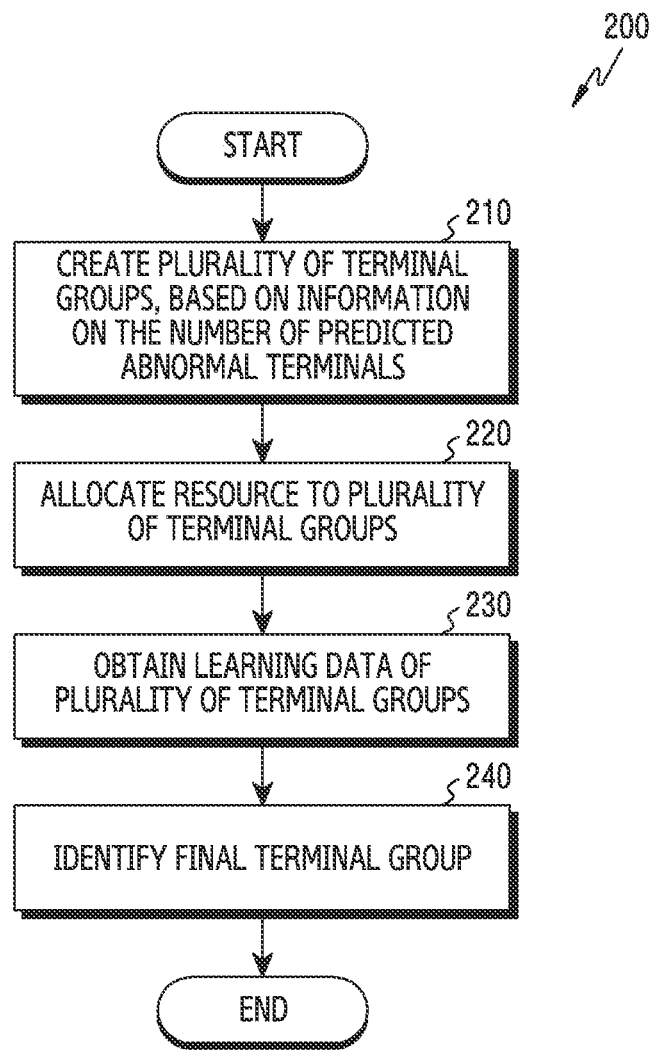
FIG. 2 is a flowchart illustrating an operation for performing wireless distributed learning according to an embodiment of the disclosure.

FIG. 2 is a flowchart illustrating an operation for performing wireless distributed learning according to an embodiment of the disclosure. Hereinafter, although a base station (e.g., the base station 101 of FIG. 1) is exemplified as a device for performing wireless distributed learning, a terminal may also be used as described above.

Referring to FIG. 2 depicting flowchart 200, in operation 210, according to an embodiment, the base station may create a plurality of terminal groups, based on information on the number of predicted abnormal terminals. According to an embodiment, the base station may repetitively perform the wireless distributed learning to obtain information on the number of predicted abnormal terminals. According to an embodiment, the abnormal terminal is a terminal which causes performance degradation of wireless distributed learning in the base station, and may include a terminal which performs at least one of an operation intentionally interfering with learning, an abnormal operation caused by an aging of the system, and an abnormal operation caused by an error in transmission on a wireless channel. For example, the terminal which performs the abnormal operation may include a byzantine fault terminal which causes the performance degradation of wireless distributed learning.

According to an embodiment, the base station may create a plurality of terminal groups so that the number of terminal groups is greater than the number of predicted abnormal terminals. For example, if the number of predicted abnormal terminals is F, the base station may create (F+1) terminal groups. Each of the terminals may belong to any one of the (F+1) terminal groups. As another example, if the number of predicted abnormal terminals is F, the base station may create (F+2) terminal groups. Each of the terminals may belong to any one of the (F+2) terminal groups. As another example, if the number of predicted abnormal terminals is F, the base station may create (F+n) terminal groups. Each of the terminals may belong to any one of the (F+n) terminal groups.

Since the number of created terminal groups is greater than the number of abnormal terminals, the abnormal terminal does not belong to at least one terminal group. Learning data obtained in a terminal group to which the abnormal terminal does not belong has a specific directivity (i.e., $\mathbb{E}[g_m^t | \theta^t] = \nabla L(\theta^t)$) and a low error rate, thereby improving performance of a wireless distributed learning system.

According to an embodiment, the base station may determine the number of terminals belonging to one terminal group, based on the total number of terminals of the entire system and the number of created terminal groups. For example, if the total number of terminals of the entire system is M and the number of created terminal groups is E, the base station may determine the number of terminals belonging to one terminal group to {[the total number of terminals of the entire system (M)/the number of groups (E)]}. As another example, the base station may determine the number of terminals belonging to one terminal group to {[the total number of terminals of the entire system (M)/the number of groups (E)]–1}.

In operation 220, according to an embodiment, the base station may allocate a resource to a plurality of terminal groups. According to an embodiment, the base station may allocate a resource for transmission of a local gradient for learning data to each of the plurality of terminal groups. For example, when each of the plurality of terminal groups transmits the local gradient for learning data by dividing it into a real part and an imaginary part, the base station may allocate a resource to each of terminal groups, based on d/2 resources in total.

According to an embodiment, the base station may allocate different resources respectively to the plurality of terminal groups. For example, the base station may allocate orthogonal resources respectively to the plurality of terminal groups. According to an embodiment, the base station may allocate different resources respectively to the plurality of terminal groups, based on at least one of an Orthogonal Frequency-Division Multiplexing (OFDM) scheme, a Frequency Division Multiplexing (FDM) scheme, and a Time Division Multiplexing (TDM) scheme. According to an embodiment, an operation in which the base station allocates resources to the plurality of terminal groups by grouping the plurality of terminals in order to allocate the different resources respectively to the plurality of terminal groups will be described below with reference to FIG. 3.

In operation 230, according to an embodiment, the base station may obtain learning data of the plurality of terminal groups. According to an embodiment, the base station may obtain the learning data of the plurality of terminal groups, based on the resources allocated respectively to the plurality of terminal groups. According to an embodiment, the base station may obtain a local gradient for the learning data of the plurality of terminal groups, based on the resources allocated respectively to the plurality of terminal groups. Since different resources are allocated respectively to the plurality of terminal groups in the aforementioned operation 202, the base station may identify a terminal group corresponding to the learning data of each of the plurality of terminal groups.

In operation 240, according to an embodiment, the base station may identify a final terminal group. According to an embodiment, the base station may identify the final terminal group, based on the received learning data of the plurality of terminal groups. According to an embodiment, the base station may identify the final terminal group, based on a local gradient for the received learning data of the plurality of terminal groups. According to an embodiment, an operation in which the base station compares the learning data of the plurality of terminal groups and reference learning data of the base station in order to identify the final terminal group among the plurality of terminal groups will be described below with reference to FIGS. 4 and 5.

Although it is illustrated in FIG. 2, for example, that a base station receives learning data (e.g., a local gradient) from a plurality of terminals to update a system, embodiments of the disclosure are not limited thereto. According to an embodiment, any one terminal among the plurality of terminals may receive the learning data (e.g., the local gradient) from the remaining terminals to update the system.

Figure 3:
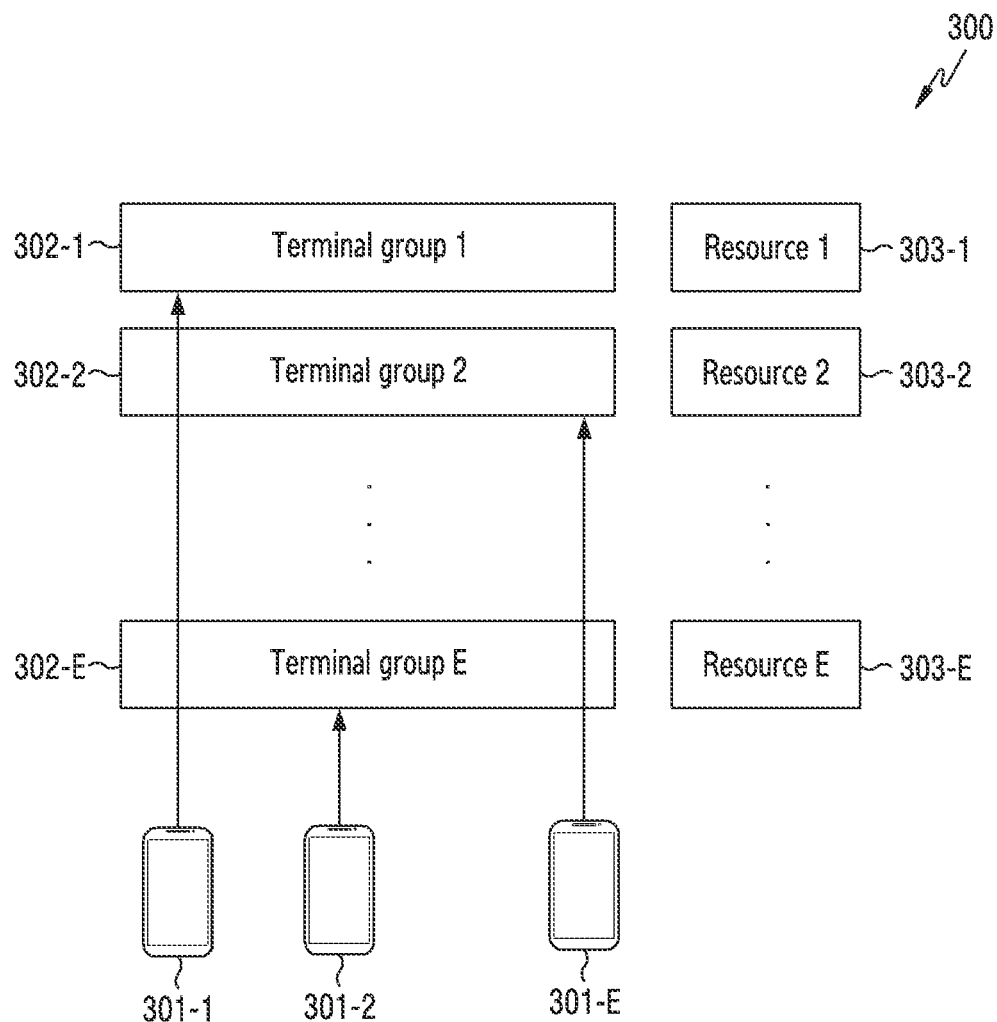
FIG. 3 illustrates an example of allocating a resource for each terminal group according to an embodiment of the disclosure.

FIG. 3 illustrates an example of allocating a resource for each terminal group according to an embodiment of the disclosure.

Referring to FIG. 3, depicting example 300, according to an embodiment, a base station may group a plurality of terminals 301-1 to 301-E into a plurality of terminal groups 302-1 to 302-E. The plurality of terminals 301-1 to 301-E may belong to only any one of the plurality of terminal groups 302-1 to 302-E. For example, the base station may perform grouping so that a terminal_1 301-1 belongs to a terminal group_1 302-1 according to a predetermined scheme. As another example, the base station may perform grouping so that a terminal_2 301-2 belongs to a terminal group_E 302-E according to a predetermined scheme. As another example, the base station may perform grouping so that the terminal_E 301-E belongs to a terminal group_2 302-2 according to a predetermined scheme.

Referring to FIG. 3, according to an embodiment, the base station may allocate any one resource among a plurality of resources 303-1 to 303-E to each of the plurality of terminal groups 302-1 to 302-E. According to an embodiment, the resources 303-1 to 303-3 allocated respectively to the plurality of terminal groups 302-1 to 302-E may be different resources. According to an embodiment, the resources 303-1 to 303-3 allocated respectively to the plurality of terminal groups 302-1 to 302-E may be orthogonal resources. For example, the base station may allocate the resource_1 303-1 to the terminal group_1 302-1 according to a predetermined scheme. As another example, the base station may allocate the resource_2 303-2 to the terminal group_2 302-2 according to a predetermined scheme. As another example, the base station may allocate the resource_E 303-3 to the terminal group_E 302-E according to a predetermined scheme. In this case, the resource_1 303-1, the resource_2 303-3, and the resource_E 303-E may be different resources which are orthogonal to each other.

Although it is illustrated in FIG. 3, for example, that a base station creates a plurality of terminal groups by grouping a plurality of terminals and allocates different resources respectively to the plurality of terminal groups, embodiments of the disclosure are not limited thereto. According to an embodiment, any one terminal among the plurality of terminals may group the remaining terminals to create a plurality of terminal groups and allocate different resources respectively to the plurality of terminal groups.

Figure 4:
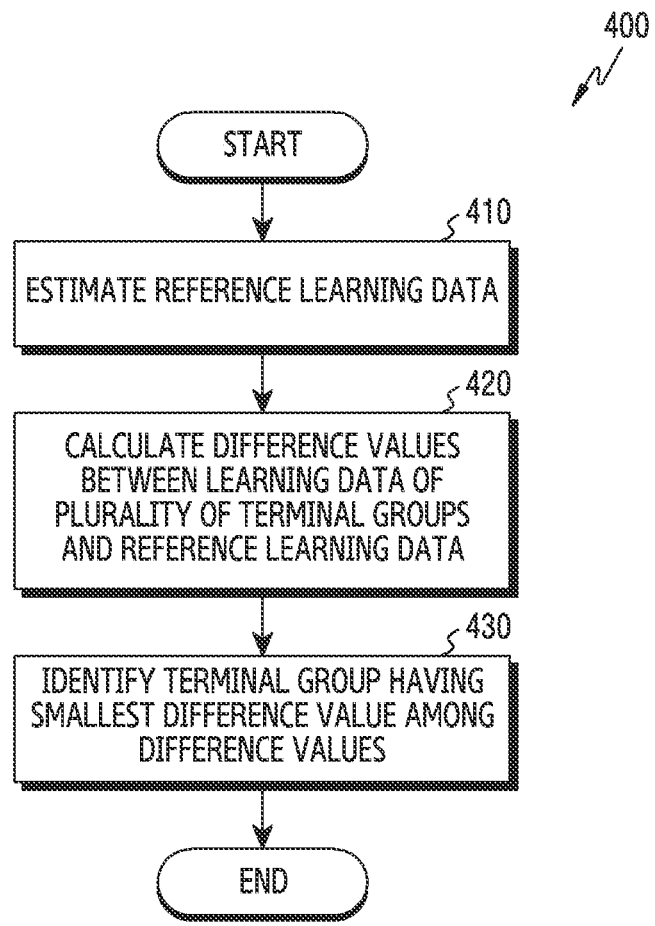
FIG. 4 is a flowchart illustrating an operation for identifying a final terminal group according to an embodiment of the disclosure.

FIG. 4 is a flowchart illustrating an operation for identifying a final terminal group according to an embodiment of the disclosure. Hereinafter, although a base station (e.g., the base station 101 of FIG. 1) is exemplified as a device for performing wireless distributed learning, a terminal may also be used as described above.

Referring to FIG. 4, depicting flowchart 400, in operation 410, according to an embodiment, a base station may estimate reference learning data. According to an embodiment, the reference learning data may include learning data obtained for a system model by the base station. According to an embodiment, the base station may estimate a reference local gradient for the reference learning data.

According to an embodiment, the base station may calculate a reference local gradient $g_0^t$ for reference learning data of the base station through a sum of a loss function and a regularization function, based on learning data obtained from the base station and a model $\theta^t$ of the entire system in t-th repetitive learning. Accordingly, a sum $L_0^B(f)$ of the loss function and the regularization function may be calculated through the equation below to obtain the reference local gradient $g_0^t$ for the reference learning data of the base station.

$$L_0^B(\theta) = \frac{1}{B}\sum_{b=1}^{B} l(f(\theta, x_{0,b}), y_{0,b}) + R(\theta) \qquad \text{Equation 3}$$

In Equation 3, $\theta \in \mathbb{R}^d$ (d is an even number) may denote a model of the entire system for learning, and a result of machine learning with an input of x may be expressed by $f(\theta,x)$. In addition, if a label for x is y, a loss function for this may be expressed by $l(f(\theta,x),y)$. $R(\theta)$ may denote a regularization function for controlling overfitting for the model of the entire system.

According to an embodiment, the base station may calculate a reference local gradient $g_0^t$ for t-th reference learning data, based on the calculated sum of the loss function and the regularization function. Therefore, the reference local gradient $g_0^t$ of the base station may be calculated through the equation below.

$$g_0^t = \nabla L_0^B(\theta^t) \qquad \text{Equation 4}$$

In Equation 4, L(θ) may denote the sum of the loss function and the regularization function.

In operation 420, according to an embodiment, the base station may calculate difference values between the learning data of the plurality of terminal groups and the reference learning data. According to an embodiment, the base station may calculate difference values between a local gradient for learning data of each of the plurality of terminal groups and the reference local gradient $g_0^t$. For example, the base station may calculate a Euclidean distance difference value $\|g_e^t - g_0^t\|$ between a local gradient $g_e^t$ for learning data of the terminal group_E among the plurality of terminal groups and the reference local gradient $g_0^t$ for the reference learning data of the base station.

In operation 430, according to an embodiment, the base station may identify a terminal group having a smallest difference value among the difference values. According to an embodiment, the base station may identify a terminal group having a smallest difference value among the difference values between the learning data of the plurality of terminal groups and the reference learning data. According to an embodiment, the base station may identify a terminal group having a smallest difference value among the difference values between the local gradient for learning data of each of the plurality of terminal groups and the reference local gradient $g_0^t$ for the reference learning data. For example, if a Euclidean distance difference value $\|g_e^t - g_0^t\|$ between the local gradient $g_e^t$ for learning data of the terminal group_E and the reference local gradient $g_0^t$ for the reference learning data of the base station is the smallest, the base station may identify the terminal group_E as a final terminal group.

According to an embodiment, the final terminal group identified through operation 430 may be a group in which only normal terminals are included. In the operation of creating the terminal groups, the number of created terminal groups is greater than the required number of abnormal terminals, and thus at least one terminal group may include only a normal terminal. This is because, when a specific terminal group has more normal terminals than a different terminal group, a difference value between learning data of the terminal group and reference learning data may be smaller than that of the different terminal group. Accordingly, the base station may perform wireless distributed learning more accurately through learning data for a terminal group in which a ratio of normal terminals is relatively high.

Although it is illustrated in FIG. 4, for example, that a base station identifies a final terminal group, based on difference values between learning data of a plurality of terminal groups and reference learning data of the base station, embodiments of the disclosure are not limited thereto. According to an embodiment, any one terminal among the plurality of terminals may identify the final terminal group, based on difference values between learning data of terminal groups to which the remaining terminals belong and the reference learning data of the base station.

Figure 5:
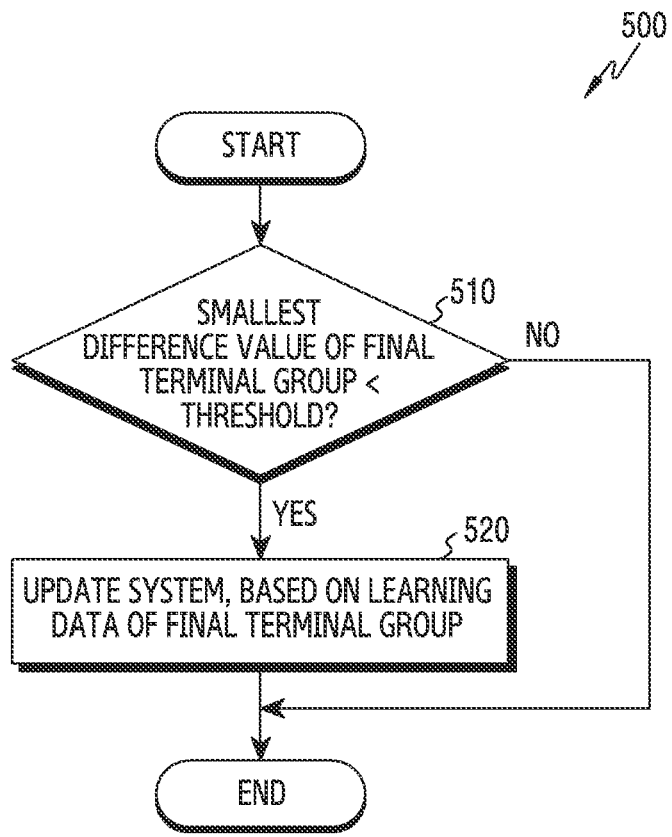
FIG. 5 is a flowchart illustrating an operation for updating a system according to an embodiment of the disclosure.

FIG. 5 is a flowchart illustrating an operation for updating a system according to an embodiment of the disclosure. Hereinafter, although a base station (e.g., the base station 101 of FIG. 1) is exemplified as a device for performing wireless distributed learning, a terminal may also be used as described above.

Referring to FIG. 5, depicting flowchart 500, in operation 510, according to an embodiment, the base station may identify whether the smallest difference value of the final terminal group is less than a threshold. According to an embodiment, if the smallest difference value of the final terminal group is less than the threshold, operation 520 may be performed. According to an embodiment, if the smallest difference value of the final terminal group is greater than or equal to the threshold, the base station may not update the system on the basis of learning data of the final terminal group. According to an embodiment, the base station may pre-set the threshold in a range for ensuring minimum performance of wireless distributed learning.

In operation 520, according to an embodiment, the base station may update the system on the basis of the learning data of the final terminal group. According to an embodiment, the base station may update the system on the basis of a final local gradient. The final optimal local gradient may include a local gradient for the learning data of the final terminal group. Accordingly, the base station may calculate a module $\theta^{t+1}$ of the system updated based on the final local gradient through the equation below.

$$\theta_{t+1} = \theta_t - \gamma^t \hat{g}^t \quad \text{Equation 5}$$

In Equation 5, $\theta^{t+1}$ may denote an updated model of the system in a (t+1)-th repetitive learning process, and $\theta^t$ may denote a model of the system in a t-th repetitive learning process before being updated. In this case, $\hat{g}^t$ may denote a final local gradient.

Although it is illustrated in FIG. 5, for example, that a base station updates a model of the entire system on the basis of learning data of a final terminal group, embodiments of the disclosure are not limited thereto. According to an embodiment, any one terminal among the plurality of terminals may update the model of the entire system on the basis of the learning data of the final terminal group among terminal groups to which the remaining terminals belong.

Figure 6:
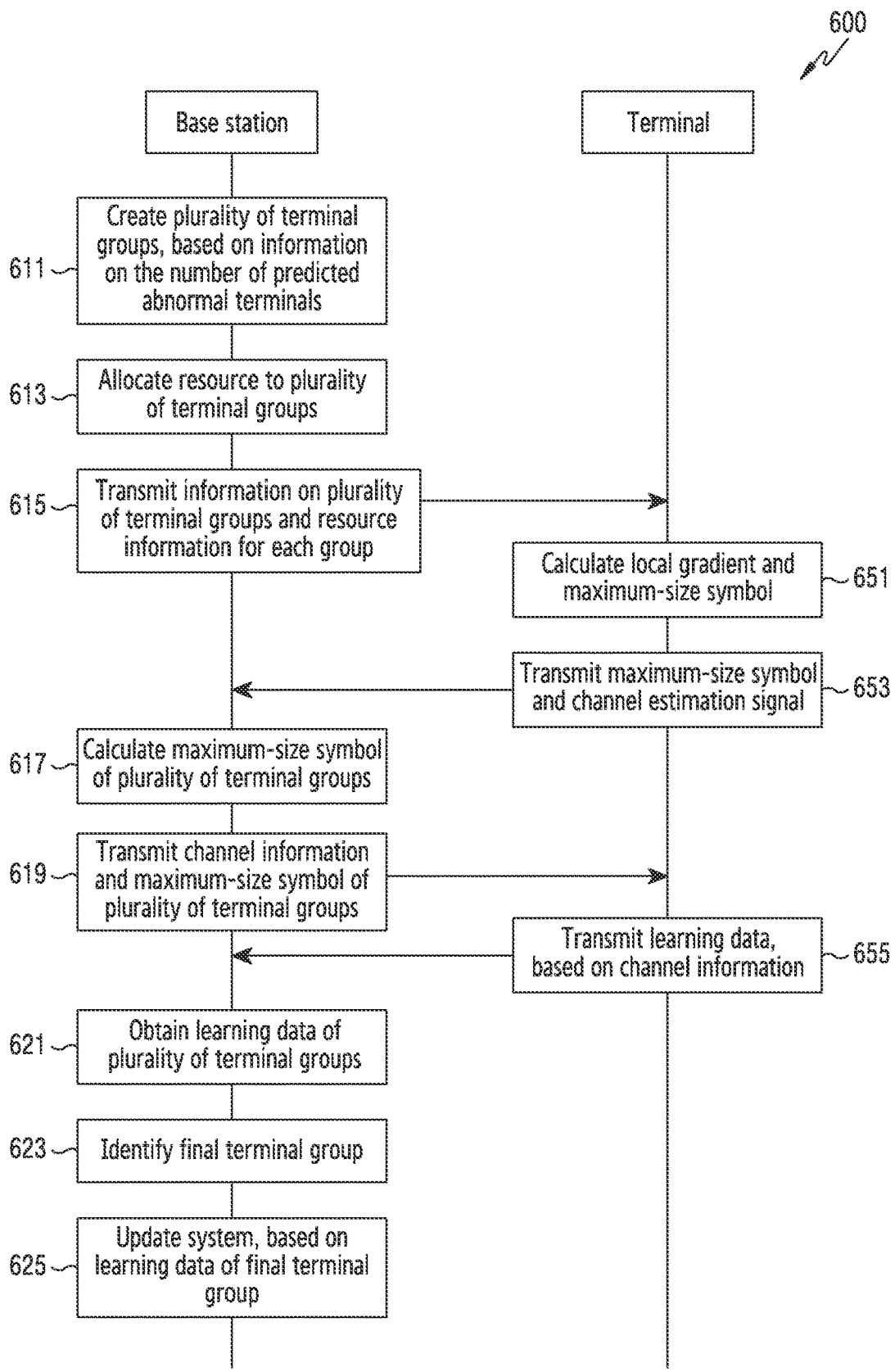
FIG. 6 is a flowchart illustrating an operation for updating a system based on wireless distributed learning data according to an embodiment of the disclosure.

FIG. 6 is a flowchart illustrating an operation for updating a system based on wireless distributed learning data according to an embodiment of the disclosure. Although a base station and a terminal are exemplified in FIG. 6, the base station may also perform operations illustrated in FIG. 6 with not only a single terminal but also each of a plurality of terminals as shown in FIG. 1.

Referring to FIG. 6, depicting flowchart 600, it is assumed that the base station updates a system on the basis of wireless distributed leaning, and the base station and each of M terminals collect B pieces of learning data and labels in an independent and identically distributed manner. In this case, $\{(x_{0,b}, y_{0,b})\}_{b=1}^{B}$ may denote data collected by the base station 101, and $\{(x_{m,b}, y_{m,b})\}_{b=1}^{B}$ may denote data collected by any terminal_m among the M terminals.

In operation 611, according to an embodiment, the base station may create a plurality of terminal groups, based on information on the number of predicted abnormal terminals.

According to an embodiment, the base station may repetitively perform the wireless distributed learning to obtain information on the number of predicted abnormal terminals. According to an embodiment, the abnormal terminal is a terminal which causes performance degradation of wireless distributed learning in the base station, and may include a terminal which performs at least one of an operation intentionally interfering with learning, an abnormal operation caused by an aging of the system, and an abnormal operation caused by an error in transmission on a wireless channel. For example, the terminal which performs the abnormal operation may include a byzantine fault terminal which causes performance degradation of wireless distributed learning.

According to an embodiment, the base station may create a plurality of terminal groups so that the number of terminal groups is greater than the number of predicted abnormal terminals. For example, if the number of predicted abnormal terminals is F, the base station may create (F+1) terminal groups. Each of the terminals may belong to any one of the (F+1) terminal groups. As another example, if the number of predicted abnormal terminals is F, the base station may create (F+2) terminal groups. Each of the terminals may belong to any one of the (F+2) terminal groups. As another example, if the number of predicted abnormal terminals is F, the base station may create (F+n) terminal groups. Each of the terminals may belong to any one of the (F+n) terminal groups.

Since the number of created terminal groups is greater than the number of abnormal terminals, the abnormal terminal does not belong to at least one terminal group. Learning data obtained in a terminal group to which the abnormal terminal does not belong has a specific directivity (i.e., $\mathbb{E}[g_m^t|\theta^t]=\nabla L(\theta^t)$) and a low error rate, thereby improving performance of a wireless distributed learning system described below.

According to an embodiment, the base station may determine the number of terminals belonging to one terminal group, based on the total number of terminals of the entire system and the number of created terminal groups. For example, if the total number of terminals of the entire system is M and the number of created terminal groups is E, the base station may determine the number of terminals belonging to one terminal group to {[the total number of terminals of the entire system (M)/the number of groups (E)]}. As another example, the base station may determine the number of terminals belonging to one terminal group to {[the total number of terminals of the entire system (M)/the number of groups (E)]−1}.

In operation 613, according to an embodiment, the base station may allocate a resource to a plurality of terminal groups. According to an embodiment, the base station may allocate a resource for transmission of a local gradient for learning data to each of the plurality of terminal groups. For example, when each of the plurality of terminal groups transmits the local gradient for learning data by dividing it into a real part and an imaginary part, the base station may allocate a resource to each of terminal groups, based on d/2 resources in total.

According to an embodiment, the base station may allocate different resources respectively to the plurality of terminal groups. For example, the base station may allocate orthogonal resources respectively to the plurality of terminal groups. According to an embodiment, the base station may allocate different resources respectively to the plurality of terminal groups, based on at least one of an OFDM scheme, an FDM scheme, and a TDM scheme.

In operation 615, according to an embodiment, the base station may transmit information on the plurality of terminal groups and resource information for each group. According to an embodiment, the base station may transmit information on resources allocated respectively to the plurality of terminal groups to the respective terminal groups.

In operation 651, according to an embodiment, each of terminals belonging to one terminal group among the plurality of terminal groups may calculate a local gradient and a maximum-size symbol.

Among the M terminals, the terminal_m may calculate a local gradient $g_m^t$ of the terminal_m through a sum of a loss function and a regularization function, based on learning data of the terminal_m and a model $\theta^t$ of the entire system in t-th repetitive learning. Accordingly, a sum $L_m^t(\theta)$ of the loss function and the regularization function may be calculated through the equation below to obtain the local gradient $g_m^t$ of the terminal_m.

$$L_m^B(\theta) = \frac{1}{B}\sum_{b=1}^{B} l(f(\theta, x_{m,b}), y_{m,b}) + R(\theta) \qquad \text{Formula 1}$$

In Formula 1, $\theta \in \mathbb{R}^d$ (d is an even number) may denote the entire model for learning, and a result of machine learning with an input of x may be expressed by $f(\theta,x)$. In addition, if a label for x is y, a loss function for this may be expressed by $(\theta,x),y)$. $R(\theta)$ may denote a regularization function for controlling overfitting for the model of the entire system.

The terminal_m may calculate a local gradient $g_m^t$ for t-th learning data, based on the calculated sum of the loss function and the regularization function. Therefore, the local gradient $g_m^t$ of the terminal_m may be calculated through the equation below.

$$g_m^t = \nabla L_m^B(\theta^t), m \in [1:M] \qquad \text{Formula 2}$$

In Formula 2, L(9) may denote the sum of the loss function and the regularization function, and $m \in [1:M]$ may denote that it is a local gradient of the terminal_m among M terminals.

According to an embodiment, the terminal_m may configure a vector $q_m^t$ based on the local gradient $g_m^t$, in order to transmit the obtained local gradient $g_m^t$ to the base station by using a specific communication scheme (e.g., an OFDM scheme). Accordingly, the vector $q_m^t$ based on the local gradient $g_m^t$ of the terminal_m may be calculated through the equation below.

$$q_m^t = [g_{m,1}^t g_{m,3}^t \cdots g_{m,d-1}^t]^T + j[g_{m,2}^t g_{m,4}^t \cdots g_{m,d}^t]^T \in \mathbb{C}^{\frac{d}{2}} \qquad \text{Equation 6}$$

In Equation 6, $[g_{m,1}^t g_{m,3}^t \cdots g_{m,d-1}^t]^T$ may denote a real part of the local gradient $g_m^t$ of the terminal_m, and $[g_{m,2}^t g_{m,4}^t \cdots g_{m,d}^t]^T$ may denote an imaginary part of the local gradient $g_m^t$ of the terminal_m.

According to an embodiment, the terminal_m may calculate a maximum-size symbol, based on the calculated vector $q_m^t$. A maximum size $\beta_m^t$ of a symbol required to transmit the calculated vector $q_m^t$ of the terminal_m may be calculated through the equation below.

$$\beta_m^t = \max_{i \in \lceil 1:d/2 \rceil} |q_{m,i}^t| \qquad \text{Equation 7}$$

In Equation 7, d/2 may denote the number of symbols necessary to transmit the calculated vector $q_m^t$ of the terminal_m.

In operation 653, according to an embodiment, the terminals belonging to the plurality of terminal groups may transmit the maximum-size symbol and a channel estimation signal. According to an embodiment, the terminals may transmit the channel estimation signal to the base station, based on a specific numerical data type (e.g., a complex number type). For example, the terminal_m belonging to any one group among the plurality of terminal groups may transmit to the base station a channel estimation signal $h_m^t$ in the form of a complex number.

In operation 617, according to an embodiment, the base station may calculate the maximum-size symbol of the plurality of terminal groups. According to an embodiment, the base station may calculate the maximum-size symbol allocated to each of the plurality of terminal groups, based on a maximum size of a symbol received from each of the terminals belonging to the plurality of terminal groups. Therefore, a maximum-size symbol $\beta_e^t$ allocated to each of the plurality of terminal groups may be calculated through the equation below.

$$\beta_e^t = \max_{i \in G_e} \beta_i^t \qquad \text{Equation 8}$$

In Equation 8, $G_e$ may denote an e-th terminal group among E terminal groups ($e \in [1:E]$).

According to an embodiment, the base station may estimate a channel ($h_m^t \in \mathbb{C}^{d/2}$) between the base station and each of the terminals, based on a channel estimation signal (e.g., a preamble) received from the terminals.

In operation 619, according to an embodiment, the base station may transmit channel information and the maximum-size symbol of the plurality of terminal groups. According to an embodiment, the base station may transmit the channel information and the maximum-size symbols $\beta_e^t$ of the plurality of transmit groups to the terminals.

According to an embodiment, the base station may transmit channel information between the base station and the terminals, to the terminals, based on channel estimation.

In operation 655, according to an embodiment, the terminals belonging to the plurality of terminal groups may transmit learning data, based on the channel information. According to an embodiment, the terminals belonging to the plurality of terminal groups may transmit a local gradient for the learning data, based on the channel information. For example, the terminal_m belonging to one terminal group among the plurality of terminal groups may calculate an n-th subcarrier before transmitting a local gradient for the learning data through the equation below.

$$s_{m,n}^t = \frac{1}{\beta_e^t} \cdot \frac{1}{h_e^t} \cdot q_{m,n}^t \cdot \mathbb{I}_A(h_{m,n}^t), n \in [1, d/2] \qquad \text{Equation 9}$$

In Equation 9, $\mathbb{I}_A(z)$ is an indication function, and may be defined by $$\mathbb{I}_A(z) = \begin{cases} 1 & z \in A \\ 0 & \text{otherwise} \end{cases} A = \{z \in \mathbb{C} : |z| \geq \tau\}.$$

In operation 621, according to an embodiment, the base station may obtain learning data of the plurality of terminal groups. According to an embodiment, the base station may obtain the learning data of the plurality of terminal groups by receiving the learning data from the plurality of terminal groups.

According to an embodiment, the base station may obtain the learning data of the plurality of terminal groups, based on a resource allocated to each of the plurality of terminal groups. According to an embodiment, the base station may obtain a local gradient for the learning data of the plurality of terminal groups, based on the resource allocated to each of the plurality of terminal groups. According to an embodiment, the base station may obtain local gradients for learning data received from terminals by adding them for each group, based on a wireless network (e.g., over-the-air computing). For example, a signal $y_{e,n}^t$ received from terminals belonging to an e-th terminal group $G_e$ may be calculated through the equation below.

$$y_{e,n}^t = \sum_{m \in G_e} h_{m,n}^t s_{m,n}^t + w_{e,n}^t = \frac{1}{\beta_e^t} \sum_{m \in G_e} q_{m,n}^t + w_{e,n}^t, n \in [1, d/2] \qquad \text{Equation 10}$$

In Equation 10, $w_e^t$ is a specific numerical data type (e.g., a complex number type), and may denote a noise generated when receiving a signal.

According to an embodiment, the base station may calculate an optimal gradient for each terminal group, based on the signal received from the plurality of terminal groups. For example, an optimal gradient $\hat{g}_e^t$ for learning data of the e-th terminal group may be calculated through the equation below.

$$\hat{g}_{e,2i-1}^t = \frac{\beta_e^t \cdot \text{Re}\{y_{e,i}^t\} + g_{0,2i-1}^t}{\sum_{m \in G_e} \mathbb{I}_A(h_{m,2i-1}^t) + 1}, i \in [1:d/2] \qquad \text{Equation 11}$$

In Equation 11, $\hat{g}_{e,2i-1}^t$ may denote a real part of the optimal gradient $\hat{g}_e^t$ for the learning data of the e-th terminal group.

$$\hat{g}_{e,2i}^t = \frac{\beta_e^t \cdot \text{Im}\{y_{e,i}^t\} + g_{0,2i}^t}{\sum_{m \in G_e} \mathbb{I}_A(h_{m,2i}^t) + 1}, i \in [1:d/2] \qquad \text{Equation 12}$$

In Equation 12, $\hat{g}_{e,2i}^t$ may denote an imaginary part of the optimal gradient $\hat{g}_e^t$ for the learning data of the e-th terminal group.

In operation 623, according to an embodiment, the base station may identify a final terminal group.

According to an embodiment, the base station may identify the final terminal group, based on the received learning data of the plurality of terminal groups. According to an embodiment, the base station may identify the final terminal group, based on a local gradient for the received learning data of the plurality of terminal groups.

According to an embodiment, the base station may estimate reference learning data. According to an embodiment, the reference learning data may include learning data obtained for a system model by the base station. According to an embodiment, the base station may estimate a reference local gradient for the reference learning data.

According to an embodiment, the base station may calculate a reference local gradient $g_0^t$ for reference learning data of the base station through a sum of a loss function and a regularization function, based on learning data obtained from the base station and a model $\theta^t$ of the entire system in t-th repetitive learning. Accordingly, a sum $L_0^B(\theta)$ of the loss function and the regularization function may be calculated through the equation below to obtain the reference local gradient $g_0^t$ for the reference learning data of the base station.

$$L_0^B(\theta) = \frac{1}{B} \sum_{b=1}^{B} l(f(\theta, x_{0,b}), y_{0,b}) + R(\theta) \qquad \text{Formula 3}$$

In Formula 3, $\theta \in \mathbb{R}^d$ (d is an even number) may denote a model of the entire system for learning, and a result of machine learning with an input of x may be expressed by $f(\theta, x)$. In addition, if a label for x is y, a loss function for this may be expressed by $l(f(\theta,x),y)$. $R(\theta)$ may denote a regularization function for controlling overfitting for the model of the entire system.

According to an embodiment, the base station may calculate a reference local gradient $g_0^t$ for t-th reference learning data, based on the calculated sum of the loss function and the regularization function. Therefore, the reference local gradient $g_0^t$ of the base station may be calculated through the equation below.

$$g_0^t = \nabla L_0^B(\theta^t) \qquad \text{Formula 4}$$

In Formula 4, $L(\theta)$ may denote the sum of the loss function and the regularization function.

According to an embodiment, the base station may identify a terminal group having a smallest difference value among the difference values. According to an embodiment, the base station may identify a terminal group having a smallest difference value among the difference values between the learning data of the plurality of terminal groups and the reference learning data. According to an embodiment, the base station may identify a terminal group having a smallest difference value among the difference values between the local gradient for learning data of each of the plurality of terminal groups and the reference local gradient $g_0^t$ for the reference learning data. For example, if a Euclidean distance difference value $\|g_e^t - g_0^t\|$ between the local gradient $g_e^t$ for learning data of the terminal group_E and the reference local gradient $g_0^t$ for the reference learning data of the base station is the smallest, the base station may identify the terminal group_E as a final terminal group.

In operation 625, according to an embodiment, the base station may update the system, based on the learning data of the final terminal group.

According to an embodiment, the base station may identify whether the smallest difference value of the final terminal group is less than the threshold. According to an embodiment, if the smallest difference value of the final terminal group is less than the threshold, the system may be updated based on the learning data of the final terminal group. According to an embodiment, if the smallest difference value of the final terminal group is greater than or equal to the threshold, the base station may not update the system on the basis of learning data of the final terminal group. According to an embodiment, the base station may pre-set the threshold in a range for ensuring minimum performance of wireless distributed learning.

According to an embodiment, the base station may update the system on the basis of the learning data of the final terminal group. According to an embodiment, the base station may update the system on the basis of a final local gradient. The final optimal local gradient may include a local gradient for the learning data of the final terminal group. Accordingly, the base station may calculate a module $\theta^{t+1}$ of the system updated based on the final local gradient through the equation below.

$$\theta_{t+1} = \theta_t - \gamma^t \hat{g}^t \qquad \text{Formula 5}$$

In Formula 5, $\theta^{t+1}$ may denote an updated model of the system in a (t+1)-th repetitive learning process, and $\theta^t$ may denote a model of the system in a t-th repetitive learning process before being updated. In this case, $\hat{g}^t$ is a final local gradient, and may denote a local gradient of a final terminal group e* (i.e., $\hat{g}^t = \hat{g}^t_{e*}$, $e^* = \arg\min_{e \in [1:E]} \|\hat{g}^t_e - g_0^t\|$).

According to an embodiment, the base station may transmit a model $\theta^{t+1}$ of the updated system to the terminals belonging to the plurality of terminal groups through a broadcast scheme. According to an embodiment, the base station and the terminals may repeatedly perform operations 611 to 625 until overall performance of wireless distributed leaning is greater than or equal to a reference value.

Although it is illustrated in FIG. 6, for example, that a base station receives learning data (e.g., a local gradient) from a plurality of terminals to update a system, embodiments of the disclosure are not limited thereto. According to an embodiment, any one terminal among the plurality of terminals may receive the learning data (e.g., the local gradient) from the remaining terminals to update the system.

As described in FIG. 6, based on information on the number of abnormal terminals of the base station, a terminal group is created to perform wireless distributed learning. Therefore, the wireless distributed learning can be prevented from performance degradation caused by the abnormal terminal, and the system can be updated efficiently through the wireless distributed learning.

Figure 7C:
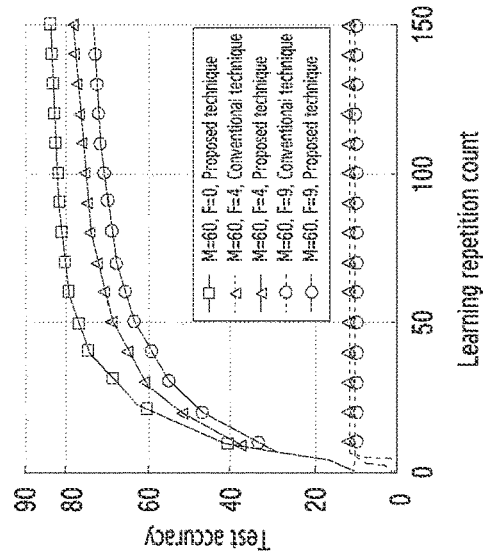
FIGS. 7A, 7B, and 7C illustrate examples of a result of wireless distributed learning according to various embodiments of the disclosure.
Figure 7B:
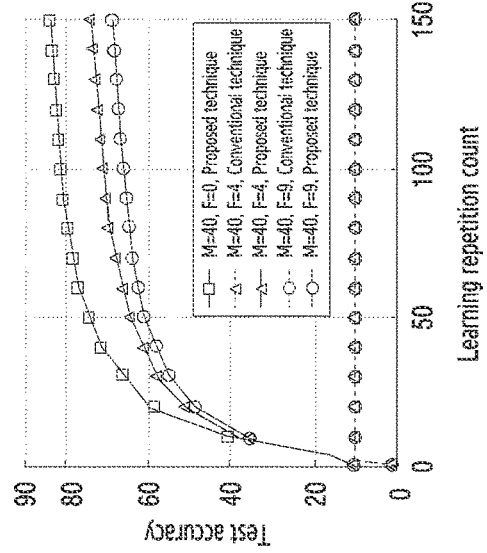
Figure 7A:
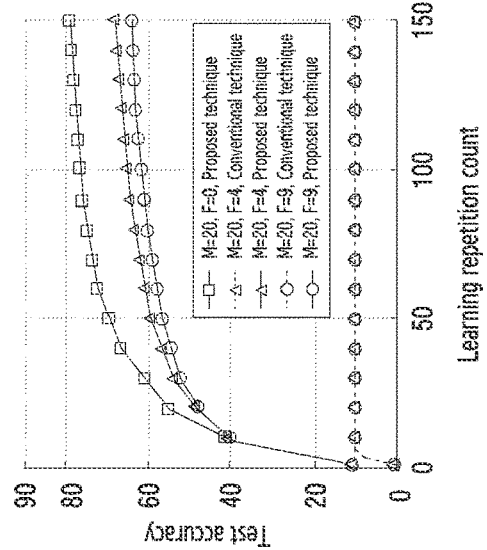

FIGS. 7A, 7B, and 7C illustrate examples of a result of wireless distributed learning according to various embodiments of the disclosure.

Referring to FIG. 7A, a graph is illustrated to compare a test accuracy between the related art technique and the proposed technique according to the disclosure when the number of terminals belonging to a plurality of terminal groups is 20, based on the number F of abnormal terminals. When the number of terminals belonging to the plurality of terminal groups is 20 and the number F of the abnormal terminals is 4, it can be seen that the test accuracy of the related art technique converges in the range of about 10%, and the test accuracy of the proposed technique converges in the range of about 66%. When the number of terminals belonging to the plurality of terminal groups is 20 and the number F of abnormal terminals is 9, it can be seen that the test accuracy of the related art technique converges in the range of about 10%, and the test accuracy of the proposed technique converges in the range of about 62%. When the number of terminals belonging to the plurality of terminal groups is 20 and the number F of abnormal terminals is 0, it can be seen that the test accuracy of the proposed technique converges in the range of about 80%.

Referring to FIG. 7B, a graph is illustrated to compare a test accuracy between the conventional technique and the proposed technique according to the disclosure when the number of terminals belonging to a plurality of terminal groups is 40, based on the number F of abnormal terminals. When the number of terminals belonging to the plurality of terminal groups is 40 and the number F of the abnormal terminals is 4, it can be seen that the test accuracy of the related art technique converges in the range of about 10%, and the test accuracy of the proposed technique converges in the range of about 72%. When the number of terminals belonging to the plurality of terminal groups is 40 and the number F of abnormal terminals is 9, it can be seen that the test accuracy of the related art technique converges in the range of about 10%, and the test accuracy of the proposed technique converges in the range of about 68%. When the number of terminals belonging to the plurality of terminal groups is 40 and the number F of abnormal terminals is 0, it can be seen that the test accuracy of the proposed technique converges in the range of about 82%.

Referring to FIG. 7C, a graph is illustrated to compare a test accuracy between the related art technique and the proposed technique according to the when the number of terminals belonging to a plurality of terminal groups is 60, based on the number F of abnormal terminals. When the number of terminals belonging to the plurality of terminal groups is 60 and the number F of the abnormal terminals is 4, it can be seen that the test accuracy of the related art technique converges in the range of about 10%, and the test accuracy of the proposed technique converges in the range of about 78%. When the number of terminals belonging to the plurality of terminal groups is 60 and the number F of abnormal terminals is 9, it can be seen that the test accuracy of the related art technique converges in the range of about 10%, and the test accuracy of the proposed technique converges in the range of about 74%. When the number of terminals belonging to the plurality of terminal groups is 60 and the number F of abnormal terminals is 0, it can be seen that the test accuracy of the proposed technique converges in the range of about 85%.

As illustrated in FIGS. 7A, 7B, and 7C, if a terminal which operates abnormally is included, the base station may update the entire system, based on an arbitrary vector received due to the abnormal operation, which may lead to performance degradation of wireless distributed learning. In this case, the arbitrary vector may be any vector independent of wireless distributed learning. However, the base station according to embodiments of the disclosure updates the system by identifying a normal terminal group, based on information on the number of predicted abnormal terminals, thereby preventing performance degradation of wireless distributed learning, caused by the abnormal terminal, and performing efficient distributed learning.

Although a result of wireless distributed learning is illustrated for example in FIGS. 7A, 7B, and 7C, embodiments of the disclosure are not limited thereto. According to an embodiment, the result of wireless distributed learning performed by any one terminal among the plurality of terminals may include a result identical or corresponding to the result of wireless distributed learning illustrated in FIGS. 7A, 7B, and 7C.

Figure 8:
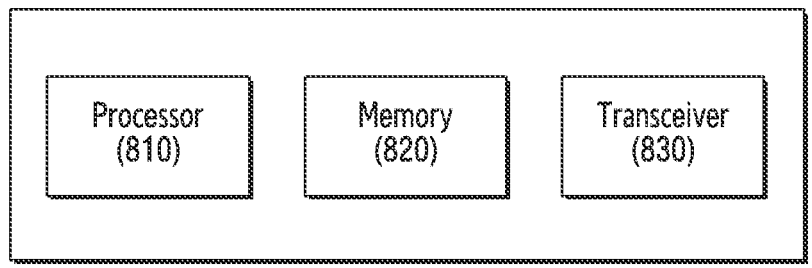
FIG. 8 illustrates a structure of a base station according to an embodiment of the disclosure.

FIG. 8 illustrates a structure of a base station according to an embodiment of the disclosure.

Referring to FIG. 8, the base station may include a processor 810, a memory 820, and a transceiver 830.

The processor 810 may provide overall control to the base station. For example, the processor 810 may create a plurality of terminal groups for a plurality of terminals in a system on the basis of information on the number of abnormal terminals. The processor 810 may allocate different resources (e.g., orthogonal resources) to the plurality of terminal groups. The processor 810 may identify a final terminal group, by comparing a difference value between learning data (e.g., a local gradient) received from the plurality of terminal groups and reference learning data of the base station. If the difference value between the learning data of the identified final terminal group and the reference learning data is less than a threshold, the processor 810 may update a model of the entire system.

The processor 810 may transmit and receive a signal via the transceiver 830. For example, the processor 810 may receive a channel estimation signal from the terminal through an allocated resource via the transceiver 830 and a signal including information on a maximum size of a symbol required to transmit learning data of the terminal.

Further, the processor 810 may perform functions of a protocol stack required in a communication standard. For this, the processor 810 may include at least one processor. The processor 810 may control the base station to perform operations according to the aforementioned embodiments.

The memory 820 may store data such as a basic program, application program, configuration information, or the like for an operation of the base station. The memory 820 may be constructed of a volatile memory, a non-volatile memory, or a combination of the volatile memory and the non-volatile memory. The memory 820 may provide the stored data at the request of the processor 810.

The transceiver 830 may perform functions for transmitting and receiving a signal through a wired channel or a wireless channel. For example, the transceiver 830 may perform a function of conversion between a baseband signal and a bit-stream according to a physical layer standard of a system. For example, in data transmission, the transceiver 830 may generate complex symbols by coding and modulating a transmission bit-stream. In addition, in data reception, the transceiver 830 may restore a reception bit-stream by demodulating and decoding a baseband signal. In addition, the transceiver 830 may up-convert a baseband signal into a Radio Frequency (RF) signal and thereafter transmit it through an antenna, and may down-convert an RF signal received through the antenna into a baseband signal. For this, the transceiver 830 may include a transmission filter, a reception filter, an amplifier, a mixer, an oscillator, a Digital to Analog Converter (DAC), an Analog to Digital Converter (ADC), or the like.

In addition, the transceiver 830 may include a plurality of transmission/reception paths. Further, the transceiver 830 may include an antenna unit. The transceiver 830 may include at least one antenna array constructed of a plurality of antenna elements. From a hardware aspect, the transceiver 830 may be constructed of a digital and analog circuit (e.g., a Radio Frequency Integrated Circuit (RFIC)). Herein, the digital circuit and the analog circuit may be implemented as one package.

In addition, the transceiver 830 may further include a backhaul communication interface for performing communication with different nodes in a network. That is, the transceiver 830 converts a bit-stream transmitted from the base station to a different node, e.g., a different access node, a different base station, an upper node, a core network, or the like, into a physical signal, and converts a physical signal received from the different node into a bit-stream.

In addition, the transceiver 830 may include different communication modules to process signals of different frequency bands. Further, the transceiver 830 may include a plurality of communication modules to support a plurality of different radio access technologies. For example, the different radio access technologies may include a Bluetooth Low Energy (BLE), a Wireless Fidelity (WiFi), a cellular network (e.g., Long Term Evolution (LTE), New Radio (NR)), or the like. In addition, the different frequency bands may include a Super High Frequency (SHF) (e.g., 2.5 GHz, 5 GHz) band and a millimeter wave (e.g., 38 GHz, 60 GHz, etc.) band. In addition, the transceiver 830 may use the same-type radio access technology on different frequency bands (e.g., an unlicensed band for Licensed Assisted Access (LAA)), Citizens Broadband Radio Service (CBRS) (e.g., 3.5 GHz)). Meanwhile, the transceiver 830 may be referred to as a communication circuit.

Figure 9:
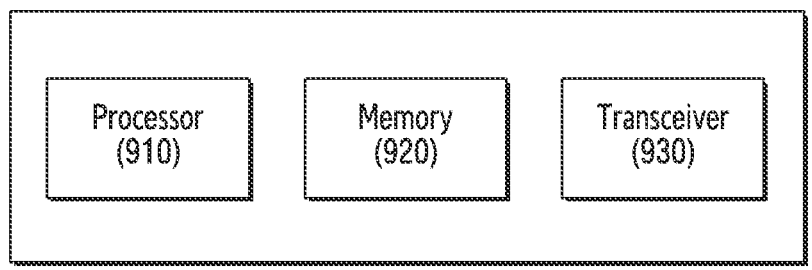
FIG. 9 illustrates a structure of a terminal according to an embodiment of the disclosure.

FIG. 9 illustrates a structure of a terminal according to an embodiment of the disclosure.

Referring to FIG. 9, the terminal may include a processor 910, a memory 920, and a transceiver 930.

The processor 910 may provide overall control to the terminal. For example, the processor 910 may calculate learning data (e.g., a local gradient) of the terminal, based on terminal group information received from the base station. For example, the processor 910 may transmit and receive a signal via the transceiver 930. For example, the processor 910 may provide control to transmit a channel estimation signal and a maximum size of a symbol required to transmit the learning data of the terminal to the base station via the transceiver 930. For example, the processor 910 may provide control to transmit the learning data of the terminal to the base station, based on a resource allocated by the base station. For this, the processor 910 may include at least one processor. The processor 910 may control the terminal to perform the aforementioned operations according to embodiments.

The memory 920 may store data such as a basic program, application program, configuration information, or the like for an operation of the terminal. The memory 920 may be constructed of a volatile memory, a non-volatile memory, or a combination of the volatile memory and the non-volatile memory. The memory 920 may provide the stored data at the request of the processor 910.

The transceiver 930 may perform functions for transmitting and receiving a signal through a wired channel or a wireless channel. For example, the transceiver 930 may perform a function of conversion between a baseband signal and a bit-stream according to a physical layer standard of a system. For example, in data transmission, the transceiver 930 may generate complex symbols by coding and modulating a transmission bit-stream. In addition, in data reception, the transceiver 930 may restore a reception bit-stream by demodulating and decoding a baseband signal. In addition, the transceiver 930 may up-convert a baseband signal into a Radio Frequency (RF) signal and thereafter transmit it through an antenna, and may down-convert an RF signal received through the antenna into a baseband signal. For this, the transceiver 930 may include a transmission filter, a reception filter, an amplifier, a mixer, an oscillator, a Digital to Analog Converter (DAC), an Analog to Digital Converter (ADC), or the like.

In addition, the transceiver 930 may include a plurality of transmission/reception paths. Further, the transceiver 930 may include an antenna unit. The transceiver 930 may include at least one antenna array constructed of a plurality of antenna elements. From a hardware aspect, the transceiver 930 may be constructed of a digital and analog circuit (e.g., a Radio Frequency Integrated Circuit (RFIC)). Herein, the digital circuit and the analog circuit may be implemented as one package.

In addition, the transceiver 930 may include different communication modules to process signals of different frequency bands. Further, the transceiver 930 may include a plurality of communication modules to support a plurality of different radio access technologies. For example, the different radio access technologies may include a Bluetooth Low Energy (BLE), a Wireless Fidelity (WiFi), a cellular network (e.g., Long Term Evolution (LTE), New Radio (NR)), or the like. In addition, the different frequency bands may include a Super High Frequency (SHF) (e.g., 2.5 GHz, 5 GHz) band and a millimeter wave (e.g., 38 GHz, 60 GHz, etc.) band. In addition, the transceiver 930 may use the same-type radio access technology on different frequency bands (e.g., an unlicensed band for Licensed Assisted Access (LAA)), Citizens Broadband Radio Service (CBRS) (e.g., 3.5 GHz)). Meanwhile, the transceiver 930 may be referred to as a communication circuit.

An electronic device according to an embodiment of the disclosure may include a communication circuit and a processor. The processor may be configured to obtain information on the number of predicted abnormal terminals, allocate different resources respectively to a plurality of terminal groups, wherein the number of the plurality of terminal groups is greater than the number of predicted abnormal terminals, obtain learning data of each of the plurality of terminal groups, and identify a final terminal group among the plurality of terminal groups, based on the learning data.

According to an embodiment, the processor may be configured to update a system on the basis of the learning data of the final terminal group.

According to an embodiment, in order to identify the final terminal group among the plurality of terminal groups, the processor may be configured to estimate reference learning data, calculate difference values between the reference learning data and learning data of each of the plurality of terminal groups, and identify a terminal group having a smallest difference value among the difference values as the final terminal group.

According to an embodiment, the processor may be further configured to identify whether the smallest difference value of the final terminal group is less than a threshold.

According to an embodiment, the processor may be further configured such that, if the smallest difference value of the final terminal group is less than the threshold, a system is updated based on the learning data of the final terminal group.

According to an embodiment, the processor may be further configured such that, if the smallest difference value of the final terminal group is greater than or equal to the threshold, a system is not updated based on the learning data of the final terminal group.

According to an embodiment, the processor may be further configured to receive a synchronization signal from at least one terminal, wherein the at least one terminal is included in any one of the plurality of terminal groups, and estimate a channel between the at least one terminal and the electronic device, based on the synchronization signal.

According to an embodiment, the processor may be further configured to allow the synchronization signal to include information on a resource required in the at least one terminal, determine a maximum amount of a resource of each of the plurality of terminal groups, based on the information, and transmit information on the maximum amount of the resource of each of the plurality of terminals to the at least one terminal.

According to an embodiment, in order to allocate the different resource to each of the plurality of terminal groups, the processor may be configured to allocate the different resource to each of the plurality of terminal groups, based on at least one of an Orthogonal Frequency-Division Multiplexing (OFDM) scheme, a Frequency Division Multiplexing (FDM) scheme, and a Time Division Multiplexing (TDM) scheme.

A method of operating an electronic device according to embodiments of the disclosure may include obtaining information on the number of predicted abnormal terminals, allocating different resources respectively to a plurality of terminal groups, wherein the number of the plurality of terminal groups is greater than the number of predicted abnormal terminals, obtaining learning data of each of the plurality of terminal groups, and identifying a final terminal group among the plurality of terminal groups, based on the learning data.

According to an embodiment, the method may further include updating a system on the basis of the learning data of the final terminal group.

According to an embodiment, the identifying of the final terminal group among the plurality of terminal groups may include estimating reference learning data, calculating difference values between the reference learning data and learning data of each of the plurality of terminal groups, and identifying a terminal group having a smallest difference value among the difference values as the final terminal group.

According to an embodiment, the method may further include identifying whether the smallest difference value of the final terminal group is less than a threshold.

According to an embodiment, the method may further include, if the smallest difference value of the final terminal group is less than the threshold, updating a system on the basis of the learning data of the final terminal group.

According to an embodiment, the method may further include, if the smallest difference value of the final terminal group is greater than or equal to the threshold, not updating a system on the basis of the learning data of the final terminal group.

According to an embodiment, the method may further include receiving a synchronization signal from at least one terminal, and estimating a channel between the at least one terminal and the electronic device, based on the synchronization signal. The at least one terminal may be included in any one of the plurality of terminal groups.

According to an embodiment, the method may further include allowing the synchronization signal to include information on a resource required in the at least one terminal, determining a maximum amount of a resource of each of the plurality of terminal groups, based on the information, and transmitting information on the maximum amount of the resource of each of the plurality of terminals to the at least one terminal.

According to an embodiment, the allocating of the different resources respectively to the plurality of terminal groups may include allocating the different resource to each of the plurality of terminal groups, based on at least one of an OFDM scheme, an FDM scheme, and a TDM scheme.

The electronic device according to various embodiments disclosed in the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in various embodiments of the disclosure may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (e.g., the program 140) including one or more instructions that are stored in a storage medium (e.g., the internal memory 136 or the external memory 138) that is readable by a machine (e.g., an electronic device). For example, a processor (e.g., the processor 120) of the machine (e.g., an electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the aforementioned components may include a single entity or multiple entities, and some of the plurality of entities may be separately disposed to different components. According to various embodiments, one or more of the aforementioned components may be omitted, or one or more different components may be added. Alternatively or additionally, a plurality of components (e.g., modules or programs) may be integrated into a single component. In this case, the integrated component may perform one or more functions of each of the plurality of components in the same or similar manner as they are performed by a corresponding one of the plurality of components before the integration. According to various embodiments, operations performed by the module, program, or different component may be carried out sequentially, in parallel, repeatedly, or heuristically, or one or more of the operations may be executed in a different order or omitted, or one or more different operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   transceiver; and
   at least one processor operably connected to the transceiver, wherein the at least one processor is configured to:
   obtain information on a number (N) of predicted abnormal terminals,
   allocate different resources respectively to a plurality of terminal groups, wherein a number (N) of the plurality of terminal groups is greater than the number (N) of predicted abnormal terminals,
   obtain learning data of each of the plurality of terminal groups,
   estimate reference learning data,
   calculate difference values between the reference learning data and the learning data of each of the plurality of terminal groups,
   identify a terminal group having a smallest difference value among the difference values, and
   identify a final terminal group among the plurality of terminal groups, based on the terminal group.

2. The electronic device of claim 1, wherein the at least one processor is further configured to update a system based on the learning data of the final terminal group.

3. The electronic device of claim 1, wherein the at least one processor is further configured to identify whether the smallest difference value of the final terminal group is less than a threshold.

4. The electronic device of claim 3, wherein the at least one processor is further configured such that, if the smallest difference value of the final terminal group is less than the threshold, a system is updated based on the learning data of the final terminal group.

5. The electronic device of claim 3, wherein the at least one processor is further configured such that, if the smallest difference value of the final terminal group is greater than or equal to the threshold, a system is not updated based on the learning data of the final terminal group.

6. The electronic device of claim 1, wherein the at least one processor is further configured to:
   receive a synchronization signal from at least one terminal, wherein the at least one terminal is included in any one of the plurality of terminal groups, and
   estimate a channel between the at least one terminal and the electronic device, based on the synchronization signal.

7. The electronic device of claim 6, wherein the at least one processor is further configured to:
   allow the synchronization signal to include information on a resource required in the at least one terminal,
   determine a maximum amount of a resource of each of the plurality of terminal groups, based on the information, and
   transmit information on the maximum amount of the resource of each of the plurality of terminal groups to the at least one terminal.

8. The electronic device of claim 1, wherein, in order to allocate the different resources to each of the plurality of terminal groups, the at least one processor is further configured to allocate the different resources to each of the plurality of terminal groups, based on at least one of an orthogonal frequency-division multiplexing (OFDM) scheme, a frequency division multiplexing (FDM) scheme, and a time division multiplexing (TDM) scheme.

9. A method performed by an electronic device, the method comprising:
   obtaining information on a number of predicted abnormal terminals;
   allocating different resources respectively to a plurality of terminal groups, wherein a number of the plurality of terminal groups is greater than the number of predicted abnormal terminals;
   obtaining learning data of each of the plurality of terminal groups;
   estimating reference learning data;
   calculating difference values between the reference learning data and learning data of each of the plurality of terminal groups; and
   identifying a terminal group having a smallest difference value among the difference values; and
   identifying a final terminal group among the plurality of terminal groups, based on the terminal group.

10. The method of claim 9, further comprising updating a system based on the learning data of the final terminal group.

11. The method of claim 9, further comprising identifying whether the smallest difference value of the final terminal group is less than a threshold.

12. The method of claim 11, further comprising, in response to the smallest difference value of the final terminal group being less than the threshold, updating a system on a basis of the learning data of the final terminal group.

13. The method of claim 11, further comprising, if the smallest difference value of the final terminal group is greater than or equal to the threshold, not updating a system on a basis of the learning data of the final terminal group.

14. The method of claim 9, further comprising:
   receiving a synchronization signal from at least one terminal; and
   estimating a channel between the at least one terminal and the electronic device, based on the synchronization signal,
   wherein the at least one terminal is included in any one of the plurality of terminal groups.

15. The method of claim 14, further comprising:
   allowing the synchronization signal to include information on a resource required in the at least one terminal;
   determining a maximum amount of a resource of each of the plurality of terminal groups, based on the information; and
   transmitting information on the maximum amount of the resource of each of the plurality of terminal groups to the at least one terminal.

16. The method of claim 9, further comprising:
   receiving a channel estimation signal from at least one terminal, the signal including information on a maximum size of a symbol required to transmit learning data of the at least one terminal.

17. The method of claim 9, wherein the allocating of the different resources respectively to the plurality of terminal groups comprises allocating resources which are orthogonal to each other.

18. The method of claim 9, further comprising:
   calculating an optimal gradient for each terminal group of the plurality of terminal groups, based on a signal received from each of the plurality of terminal groups.

* * * * *